United States Patent Office 2,821,544
Patented Jan. 28, 1958

2,821,544

PRODUCTION OF ALKYLISOCYANATE ESTERS OF 2-ALKENOIC ACIDS

Hans Holtschmidt, Koln-Stammheim, Germany, assignor to Farbenfabriken Bayer Aktiengesellschaft, Leverkusen, Germany, a corporation of Germany No Drawing. Application April 25, 1955
Serial No. 508,315

Claims priority, application Germany April 26, 1954

8 Claims. (Cl. 260—486)

(Filed under Rule 47(b) and 35 U. S. C. 118)

This invention relates to a new process of producing useful compositions of matter, more particularly polymerizable and copolymerizable isocyanate compositions. Still more particularly the invention is concerned with the production of polymerizable and copolymerizable ester-isocyanates having the general formula

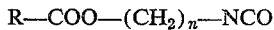
$$R-COO-(CH_2)_n-NCO$$

in which R represents a monovalent aliphatic unsaturated hydrocarbon radical and $n$ stands for an integer of from 1-4.

In United States Letters Patent 2,468,713 o-, m- and p-vinylphenyl isocyanate (styryl isocyanate) are described to be polymerizable isocyanates. These isocyanates are accessible only by a rather complicated method, namely by splitting off water from aminophenyl methylcarbinol and subsequent treatment with phosgene. Other previously known polymerizable isocyanates (see United States Letters Patent 2,606,892) are allyl isocyanate and other aliphatic isocyanates of the general formula $$CH_2=CR-(A)_n-CH_2-NCO$$

These isocyanates, however, suffer from the disadvantage that their polymerization velocity is unsatisfactory. Finally, acryl- and methacryl isocyanate

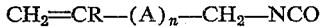
$$CH_2=CH-CO-NCO$$

and

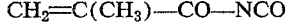
$$CH_2=C(CH_3)-CO-NCO$$

have been disclosed by Th. Lieser (Berichte 84, pages 4-12 (1951)); these isocyanates are obtainable from the corresponding acid chlorides and silver cyanate and are extremely instable as acyl isocyanates.

It is an object of the present invention to provide a new and simple process for the production of polymerizable and copolymerizable isocyanate compositions, more particularly ester-isocyanates.

It is another object to provide a new process of producing polymerizable and copolymerizable isocyanate compositions which are characterized by a strong tendency to polymerize with one another or with other chemical compounds.

It is still another object to provide a new and efficient process of producing polymerizable and copolymerizable isocyanate compositions which are especially valuable as intermediates, for instance in the production of plastics.

Further objects and advantages of the invention will become apparent to those skilled in the art from the following more detailed description.

In accordance with the present invention it has been found that polymerizable and copolymerizable isocyanate compositions, particularly ester-isocyanates, can be obtained by an efficient and convenient process by esterifying unsaturated carboxylic acids such as acrylic acid, methacrylic acid or crotonic acid, or derivatives thereof, for instance anhydrides and acid chlorides, with the chlorohydrates of amino alcohols and treating the resultant hydrochlorides of the esterified amino alcohols with phosgene according to conventional methods. If for instance acrylic or methacrylic acid are used as starting material, the hydrogen chloride split off in the treatment of the chlorohydrate with phosgene is attached to the double bond, and for instance β-chloropropionic acid- or β-chloroisobutyric ester isocyanates result. For this reason, the isocyanates are required to be subjected to reaction conditions under which the hydrogen chloride attached to the double bond is split off again. This can be accomplished by various methods: for instance, the hydrogen chloride can be split off catalytically by distilling the β-chloro fatty acid ester isocyanate over zinc chloride, activated carbon or silicic acid catalysts, or passing the vapors of these ester-isocyanates over suitable catalysts having a large surface. Another method of splitting off the hydrogen chloride, which generally proceeds with almost quantitative yields, is the reaction with tertiary bases, preferably relatively weak bases, for instance quinoline or dialkyl anilines, at temperatures of between 100 and 200° C. Strong tertiary bases are capable of exerting a polymerizing influence on the NCO group and therefore are not suitable according to the invention. By splitting off the hydrogen chloride with weak tertiary bases the yields amount to 80-90% of the theoretical.

β-Halogeno fatty acids and derivatives thereof are mostly less expensive and more convenient to handle than the related unsaturated compounds. Therefore, instead of using unsaturated compounds which take up hydrogen chloride during the treatment with phosgene, for instance acrylic acid and methacrylic acid, it is of advantage to start from the corresponding β-halogeno fatty acids or their derivatives and to split off the halogen chloride subsequently.

In order to avoid polymerization of the double bond taking place, it is preferable to split off the hydrogen chloride in the presence of polymerization inhibitors, which do not react with NCO groups at the reaction temperatures, for instance anthraquinone, sulfur or pulverized copper, and to carry out reaction in the absence of atmospheric oxygen.

The process of the invention may be carried out for instance by heating the components in an indifferent organic solvent, for instance benzene, toluene or xylene, to temperatures of between 50 and 150° C. During the reaction, esters are formed between the chlorohydrate of the amino alcohol and the acid or acid derivative. In most cases the ester need not be isolated and purified but the amino ester, which is present in the form of its chlorohydrate, can be treated with phosgene while refluxing the indifferent organic solvent until the ester has been converted to the ester-isocyanate, which becomes evident by the formation of a clear solution.

The ester-isocyanates obtained according to the invention are water-clear, distillable, light-resistant compounds which are characterized by a strong tendency to polymerize with one another or with other unsaturated compounds. They are valuable intermediate products in organic chemistry, especially in the manufacture of plastics.

The invention is further illustrated by the following examples without being restricted thereto:

*Example 1*

194 grams (2 mols) of dry ethanolaminochlorohydrate are suspended in 500 cc. of dry toluene. 279.4 grams (2 mols+10% excess) of β-chloropropionyl chloride are slowly introduced in drops with stirring at a temperature of between 60 and 100° C. The mixture is then refluxed for 2 hours until hydrogen chloride is not split off any longer. At temperatures above 65° C., the β-chloropropionyloxyethylaminohydroxy chloride is present in the form of an emulsion in toluene. Phosgene is then introduced at reflux temperature until all the hydrochloride is dissolved and a clear solution is obtained; this takes 3 hours. After blowing out the excess phosgene with nitrogen and distilling off the toluene the crude β-chloropropionyloxyethyl isocyanate is obtained in a quantity of 340 grams=89% of the theoretical. Water-clear liquid giving off a penetrating odor; B. P.: 136°–137° C. at 16 mm. Hg. 354 grams (2 mols) of the thus obtained β-chloropropionyloxyethyl isocyanate are reacted with 285 grams of quinoline (the calculated quantity+10% excess) with the addition of 3.5 grams of anthraquinone and heated in a nitrogen stream to 160° C. (oil bath temperature). After stopping heat supply, the temperature within the flask rises to 163–165° C. while the content of the flask bubbles up vivaciously. After cooling to 120° C. vacuum is applied and the acrylic ester-isocyanate distilled off. The crude product (243 grams=86.5% of the theoretical), which distills over between 80 and 95° C. at a pressure of 15 mm. Hg, is distilled once more over 1% of anthraquinone. Yield: 224 grams=79% of the theoretical; B. P.: 80–82° C. at 10 mm. Hg. The ester isocyanate is a water-clear solution giving off a penetrating odor.

*Example 2*

177 grams (1 mol) of the β-chloropropionyloxyethyl isocyanate prepared according to Example 1 are heated in vacuo to boiling temperature and the vapors formed passed through a vertical glass tube, and loosely filled over a length of about 75 cm. with well dried activated carbon having a granular size of 3 mm., the glass tube is heated to 230–250° C. Hydrogen chloride is split off in a vivacious reaction, the unsaturated β-chloropropionyloxyethyl isocyanate flows back to the flask whereas the acrylic ester described in Example 1 distills over between 80 and 90° C. The ester-isocyanate can be separated from the chloropropionyl isocyanate by fractionation.

*Example 3*

194 grams (2 mols) of ethanolaminochlorohydrate are esterified according to Example 1 in 500 cc. of toluene with 237.6 grams (2 mols+10% excess) of crotonic acid chloride. The reaction product is then treated with phosgene as described in Example 1 until a completely clear solution is obtained; this takes about 3 hours. The excess phosgene is removed by blowing with nitrogen and the toluene is removed by distillation. The crotonic ester isocyanate (CH₃—CH=CH—COO—(CH₂)₂NCO) boils at 99°–101° C. at 9 mm. Hg. Yield: 166 grams=52% of the theoretical.

*Example 4*

122 grams (2 mols) of ethanol amine are suspended in 600 cc. of toluene. Hydrochloride is then introduced until the suspension is saturated. The temperature is kept at above 70° C. so that a suspension of the molten ethanol aminochlorohydrate in toluene is obtained. After the addition of a small quantity (about 0.5 gram) of anthraquinone at a temperature between 70 and 100° C., 223.4 grams of methacryl chloride are added dropwise and the mixture is reacted in a nitrogen atmosphere for 2 hours.

The reaction product is treated with phosgene as described in Example 1 until all the hydrochloride has been dissolved, which is the case after about 4–6 hours. After distillation pure methacrylic acid ester isocyanate is obtained in a yield of 70%; B. P. 87–89° C. at 10 mm. Hg.

The corresponding β-chloroisobutyric acid ester isocyanate, which is formed by chemical addition of hydrochloride to the double bond, is left in the flask in a yield of 20%.

I claim:

1. In the manufacture of an ester isocyanate by a process which comprises esterifying a member selected from the group consisting of 2-alkenoic acids having from 3 to 4 carbon atoms, their anhydrides and chlorides, and thereafter phosgenating the resulting ester, the step which comprises reacting the said member with a chlorohydrate of an amino alcohol having the formula $$HO—(CH_2)_n—NH_2HCl$$

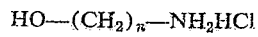

wherein $n$ is an integer of from 1 to 4 while the two compounds are dissolved in an inert organic solvent at a temperature of from about 50° C. to about 150° C. to form a compound having the formula $$R—COO(CH_2)_nNH_2HCl$$

wherein R—COO is derived from a 2-alkenoic acid having from 3 to 4 carbon atoms and $n$ has the same meaning as above.

2. A method for making an ester isocyanate which comprises reacting a member selected from the group of compounds consisting of 2-alkenoic acids having from 3 to 4 carbon atoms, their anhydrides and chlorides, with a chlorohydrate of an amino alcohol having the formula $$HO—(CH_2)_n—NH_2HCl$$

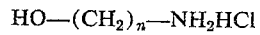

wherein $n$ is an integer of from 1 to 4 while the two compounds are dissolved in an inert organic solvent at a temperature of from about 50° C. to about 150° C. to form an amino ester hydrochloride, and thereafter reacting the ester with phosgene to form an ester isocyanate.

3. The process of claim 2 wherein the reaction between the amino ester hydrochloride and phosgene is conducted at the boiling point of the solvent.

4. The process of claim 2 wherein the solvent is toluene and the phosgenation is conducted at reflux temperatures.

5. A process in accordance with claim 2 wherein said aminoalcohol is ethanolamine and said aromatic hydrocarbon solvent is toluene.

6. A method for making an acrylic ester isocyanate which comprises esterifying acrylic acid with a chlorohydrate of an amino alcohol having the formula $$HO—(CH_2)_n—NH_2HCl$$

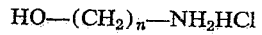

wherein $n$ is an integer of from 1 to 4 while dissolved in an inert solvent and at a temperature of from about 50° C. to about 150° C., phosgenating the resulting amino ester hydrochloride to form the corresponding saturated ester isocyanate, and thereafter splitting off hydrogen chloride to convert the saturated ester isocyanate into the corresponding unsaturated ester isocyanate.

7. A method for making an acrylic ester isocyanate which comprises esterifying β-chloropropionyl chloride with a chlorohydrate of an amino alcohol having the formula $$HO—(CH_2)_n—NH_2CHl$$

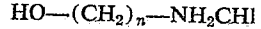

wherein $n$ is an integer of from 1 to 4 while dissolved in an inert solvent and at a temperature of from about 50° C. to about 150° C., phosgenating the resulting amino ester hydrochloride to form the corresponding saturated ester isocyanate, and thereafter splitting off hydrogen chloride to convert the saturated ester isocyanate into the corresponding unsaturated ester isocyanate.

8. A method for making an unsaturated ester isocyanate which comprises reacting crotonic acid with the chlorohydrate of an amino alcohol having the formula $$HO—(CH_2)_n—NH_2HCl$$

wherein $n$ is an integer of from 1 to 4, while the two compounds are dissolved in an inert organic solvent at a temperature of from about 50° C. to form the amino ester hydrochloride, and thereafter reacting the ester with phosgene to form an ester isocyanate having the formula $$CH_3—CH=CH—COO(CH_2)_nNCO$$

wherein $n$ is an integer of from 1 to 4.

References Cited in the file of this patent
UNITED STATES PATENTS

| | | |
|---|---|---|
| 2,340,757 | Kaase et al. | Feb. 1, 1944 |
| 2,679,530 | Porret | May 25, 1954 |
| 2,718,516 | Bortnick | Sept. 20, 1955 |

OTHER REFERENCES

Wagner et al.: "Synthetic Organic Chemistry" (1953), pp. 640–1.